United States Patent
Aoki et al.

(10) Patent No.: US 10,955,696 B2
(45) Date of Patent: Mar. 23, 2021

(54) ELECTRO-OPTICAL DEVICE, AND PROJECTION-TYPE DISPLAY APPARATUS

(71) Applicant: SEIKO EPSON CORPORATION, Tokyo (JP)

(72) Inventors: Toru Aoki, Shiojiri (JP); Ai Koike, Azumino (JP); Hiroaki Mochizuki, Azumino (JP); Noriaki Miyasaka, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/394,000

(22) Filed: Apr. 25, 2019

(65) Prior Publication Data

US 2019/0331957 A1 Oct. 31, 2019

(30) Foreign Application Priority Data

Apr. 26, 2018 (JP) .............................. JP2018-084836

(51) Int. Cl.
*G02F 1/1333* (2006.01)
(52) U.S. Cl.
CPC .... *G02F 1/133385* (2013.01); *G02F 2203/64* (2013.01)
(58) Field of Classification Search
CPC .................. G02F 1/133385; G02F 2203/64

USPC .......................................................... 349/161
See application file for complete search history.

(56) References Cited

U.S. PATENT DOCUMENTS

| 2002/0044126 | A1 | 4/2002 | Aoki | |
|---|---|---|---|---|
| 2008/0284699 | A1* | 11/2008 | Yano | G09G 3/3607 345/89 |
| 2013/0300961 | A1* | 11/2013 | Tomikawa | G02F 1/13306 349/33 |

FOREIGN PATENT DOCUMENTS

| JP | 2002-182622 A | 6/2002 | |
|---|---|---|---|
| JP | 2008-233500 A | 10/2008 | |
| JP | 2010-197806 A | 9/2010 | |
| JP | 2012137602 A | * 7/2012 | ........ G02F 1/133711 |
| JP | 2012-252062 A | 12/2012 | |
| JP | 2013-235171 A | 11/2013 | |

* cited by examiner

*Primary Examiner* — Nathanael R Briggs
*Assistant Examiner* — William D Peterson
(74) *Attorney, Agent, or Firm* — Oliff PLC

(57) ABSTRACT

An electro-optical device includes a display panel including a liquid crystal layer interposed between a pair of substrates, and in the electro-optical device, a normal display mode and a refresh mode serving as a specific display mode in which the display panel is set to have a predefined temperature higher than ordinary temperature and lower than an Ni point of the liquid crystal layer and is energized in display where brightness becomes homogeneous in a screen are selectable.

13 Claims, 10 Drawing Sheets

ELECTRO-OPTICAL DEVICE, AND PROJECTION-TYPE DISPLAY APPARATUS

The present application is based on, and claims priority from JP Application Serial Number 2018-084836, filed Apr. 26, 2018, the disclosure of which is hereby incorporated by reference herein in its entirety.

BACKGROUND

1. Technical Field

The disclosure relates to an electro-optical device, and a projection-type display apparatus including the electro-optical device.

2. Related Art

A liquid crystal device serving as an electro-optical device includes a liquid crystal layer serving as an electro-optical element interposed between a pair of substrates. When a direct current voltage of homopolarity is continuously applied to the liquid crystal layer, a liquid crystal material deteriorates, and, for example, specific resistance changes to cause an improper display. Thus, as a driving method for such a liquid crystal device, an alternating current-drive is used, and in the alternating current-drive, a voltage applied to the liquid crystal layer is polarity reversed at a constant cycle, for example, at a cycle of one horizontal period or one field period.

However, it is known that when a positive voltage effective value and a negative voltage effective value are different in the alternating current-drive, a bias in the polarity of a potential is generated in a pixel, and a display failure such as a flicker and image retention occurs.

As measures for mitigating such a display failure, for example, JP-A-2002-182622 proposes a liquid crystal display device including, between a data line and a pixel electrode, a switching element configured to be turned on and off in accordance with a signal level of a scanning line, and performing polarity reversion for each predefined period with horizontal scanning and vertical scanning as a reference to apply the polarity-reversed voltage to a pixel electrode via a data line, and in the liquid crystal display device, an image signal correction circuit includes a correction amount output unit configured to output a correction amount corresponding to a level of an image signal to be corrected and an adder configured to add the correction amount to the image signal to be corrected and to output the image signal to be corrected as an image signal corrected.

In addition, for example, JP-A-2012-252062 proposes a liquid crystal display device including a light source and a liquid crystal panel configured to generate an image by using light emitted from the light source, and in the liquid crystal display device, the liquid crystal panel includes a pixel electrode to which a current is applied based on an image signal and a counter electrode provided to be spaced apart from the pixel electrode at an interval, the liquid crystal display device includes a light amount controller configured to control the amount of light incident on the liquid crystal panel and a voltage controller configured to control a voltage to be applied to the counter electrode, the voltage controller being configured to vary the voltage to be applied to the counter electrode depending on a controlling mode of the amount of light performed by the amount of light controller.

According to JP-A-2002-182622 and JP-A-2012-252062 described above, when a transistor serving as the switching element is in an OFF state by light incident on the liquid crystal panel, a leakage current occurs to deteriorate a voltage holding characteristic in a pixel, and a flicker and image retention occurring owing to a difference between a positive voltage effective value and a negative voltage effective value in the alternating current-drive can be mitigated.

However, the difference between the positive voltage effective value and the negative voltage effective value that occurs in the alternating current-drive is not necessarily based on one factor, and even when the measures disclosed in JP-A-2002-182622 and JP-A-2012-252062 described above are applied, image retention is likely to occur, for example, in a state where a still image continues to be displayed for a long time. Accordingly, there has been demand for a measure or a method enabling mitigation of a display failure such as image retention after the display failure has occurred.

SUMMARY

An electro-optical device of the present application includes a display panel including a liquid crystal layer interposed between a pair of substrates, and in the electro-optical device, a normal display mode, and a specific display mode in which the display panel is set to have a predefined temperature higher than ordinary temperature and lower than an Ni point of the liquid crystal layer and is energized for display where brightness is homogeneous in a screen are selectable.

In the electro-optical device described above, light from a light source is caused to be incident on the display panel, and the display panel is set to have the predefined temperature.

In addition, the electro-optical device described above may include a heating unit configured to warm the display panel to a predefined temperature.

In the electro-optical device described above, the predefined temperature is within a range of from 40° C. to 90° C.

In addition, in the electro-optical device described above, in the specific display mode, a drive voltage for display is preferably set to cause a variation in a light transmittance of a pixel in the display panel relative to the transmittance in the display panel when not energized to be 0.1% or less.

In addition, in the electro-optical device described above, the display panel is of normally black, and in the specific display mode, a drive voltage for display may be set to cause an increase in a light transmittance of a pixel in the display panel relative to the transmittance in the display panel when not energized to be 0.1% or less.

In addition, the electro-optical device described above may include a timer configured to set energization time in the specific display mode.

A projection-type display apparatus according to the present application includes a light source, a light modulating unit configured to modulate light from the light source, based on image information, and a projection optical system configured to enlarge and project display light modulated by the light modulating unit, and in the projection-type display apparatus, as the light modulating unit, the electro-optical device according to any of the above is used.

In addition, in the projection-type display apparatus described above, a menu screen configured to enable selection of the specific display mode is preferably displayed.

In the projection-type display apparatus described above, the menu screen is preferably displayed during an off sequence for turning off a power source.

The projection-type display apparatus described above may be configured such that the electro-optical device is configured to cause, during a period in which the specific display mode is being executed, a light amount of the light source to be reduced compared to the normal display mode.

The projection-type display apparatus described above may include a cooling unit configured to cool down the display panel, wherein the electro-optical device is configured, during a period in which the specific display mode is being executed, to cause the cooling unit to cease cooling down or to lower a cooling capacity.

An electro-optical device of the present application includes a display panel including a liquid crystal layer interposed between a pair of substrates, and in the electro-optical device, a normal display mode, and a specific display mode in which the display panel is set to have a predefined temperature higher than ordinary temperature and lower than an Ni point of the liquid crystal layer, and an identical drive voltage is applied to each pixel located in a screen contributing to display by the display panel are selectable.

DESCRIPTION OF EXEMPLARY EMBODIMENTS

Exemplary embodiments of the invention will be described below with reference to the drawings. Note that in each of the accompanying figures, to illustrate each of portions described at a recognizable size, the portions are appropriately scaled up or down.

Projection-Type Display Apparatus

Figure 1:
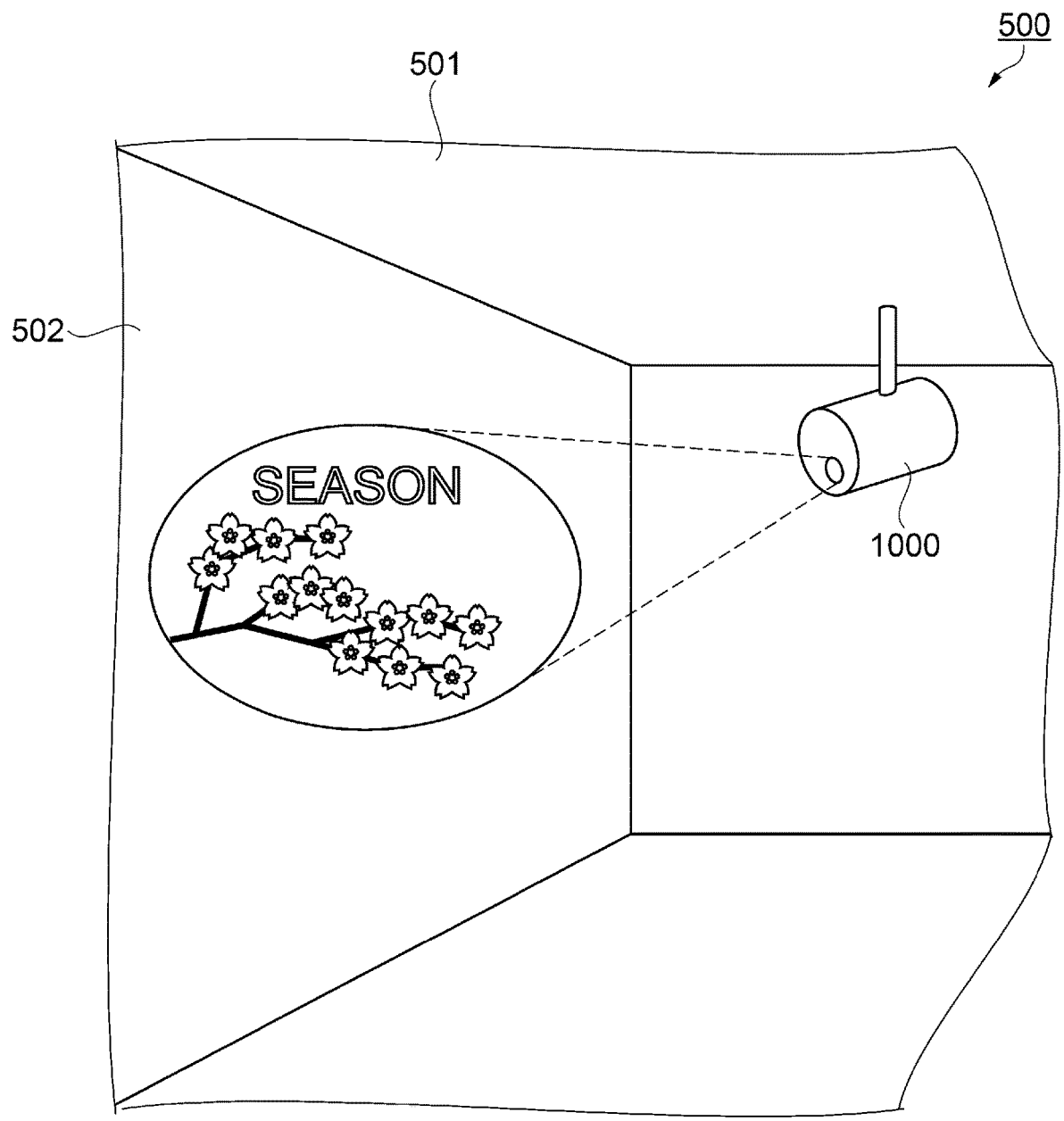
FIG. 1 is a schematic perspective view illustrating an illumination-type projector.

First, an illumination-type projector will be described as an example of a projection-type display apparatus of an exemplary embodiment with reference to FIGS. 1 and 2. FIG. 1 is a schematic perspective view illustrating an illumination-type projector, and FIG. 2 is a block diagram illustrating an optical and electrical configuration of the illumination-type projector.

As illustrated in FIG. 1, a projector 1000 of an illumination type serving as the projection-type display apparatus of the exemplary embodiment includes a housing having, for example, a cylindrical shape, and includes, inside the housing, a light source, a light modulating unit configured to modulate light from the light source based on image information, and a projection optical system configured to enlarge and project display light modulated by the light modulating unit. As illustrated in FIG. 1, such a projector 1000 is, for example, suspended from a ceiling 501 of a showroom 500 and is capable of projecting a still image or a moving image based on, for example, image information for promotion through a projection port provided on a side surface of the housing to a wall surface 502 intersecting the ceiling 501. In addition, when an object such as a product is disposed in front of the wall surface 502, and light from the light source is projected toward the object, the projector 1000 can also be utilized as illumination for the object. In addition, the object can also be illuminated in a state where, for example, a logo of a product or the like is displayed. Although a specific configuration of the projector 1000 will be described below, since the projector 1000 is capable of displaying color, the projector 1000 is capable of dynamically irradiating the object with illumination light of multiple colors as well as a single color such as white. That is, the projector 1000 of an illumination type serves as a projection-type display apparatus capable of providing various kinds of renditions to an object.

Figure 2:
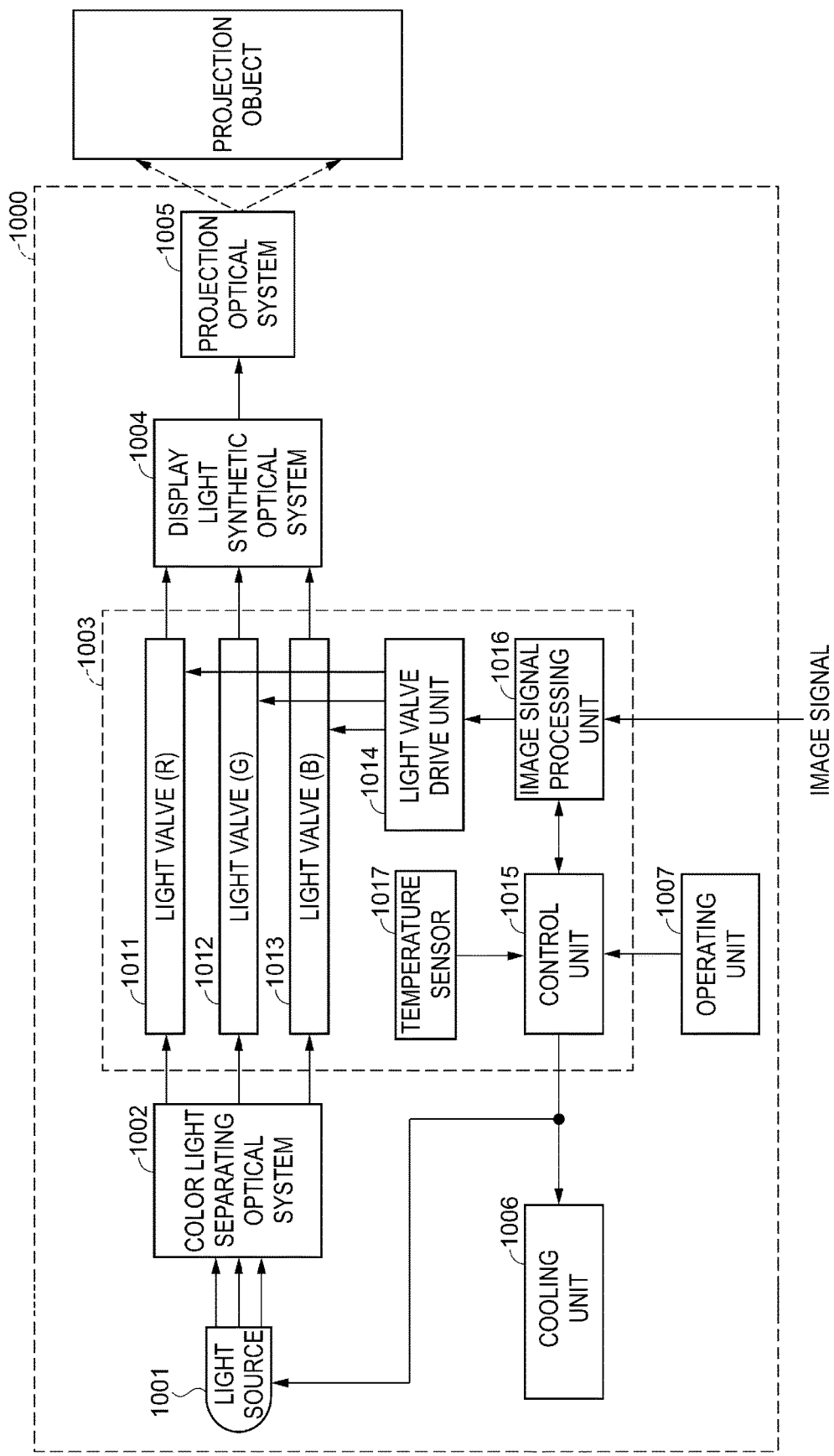
FIG. 2 is a block diagram illustrating an optical and electrical configuration of the illumination-type projector.

As illustrated in FIG. 2, the projector 1000 includes a light source 1001, a color light separating optical system 1002, an electro-optical device 1003 serving as a light modulating unit, a display light synthetic optical system 1004, a projection optical system 1005, a cooling unit 1006, and an operating unit 1007.

The light source 1001 is, for example, a laser light source, and even when the light source 1001 has a compact size, a high-luminance illumination light can be obtained. In addition, the light source 1001 is configured to have a long lifespan and have a color tone difficult to change over time. Note that the light source 1001 is not limited to a laser light source and may be an LED or an ultra-high-pressure mercury lamp, for example.

The color light separating optical system 1002 is a system for separating the light emitted from the light source 1001 into red light (R), green light (G), and blue light (B), and, for example, is composed of using a dichroic mirror configured to reflect light of a specific wavelength and transmit light of other wavelengths.

The electro-optical device 1003 includes three light valves 1011, 1012, and 1013 capable of modulating the red light (R), the green light (G), and the blue light (B), respectively, separated by the color light separating optical system 1002. The three light valves 1011, 1012, and 1013 serve as display panels each including a liquid crystal layer interposed between a pair of substrates in the electro-optical device 1003. In addition, the electro-optical device 1003 includes a light valve drive unit 1014, a control unit 1015, an image signal processing unit 1016, and a temperature sensor 1017. In the electro-optical device 1003, a normal display mode, and a specific display mode in which the three light valves 1011, 1012, and 1013 serving as the display panels are each set to have a predefined temperature higher than ordinary temperature (25° C.) and lower than a phase transition temperature (transition temperature from a nematic phase to an isotropic phase: an Ni point) at which the liquid crystal layer becomes optically isotropic and are energized in display (solid display) in which brightness becomes homogeneous in a screen are selectable.

The image signal processing unit 1016 is configured to convert an image signal input from the exterior based on image information into an image signal corresponding to each of the light valves 1011, 1012, and 1013 and to deliver the image signal to the light valve drive unit 1014. The light valve drive unit 1014 is configured to drive each of the three light valves 1011, 1012, and 1013 in accordance with the image signal delivered from the image signal processing unit 1016.

The light valve 1011 is configured to modulate the red light (R) incident based on an image signal and to emit the modulated light as display light. The light valve 1012 is configured to modulate the green light (G) incident based on an image signal and to emit the modulated light as display light. The light valve 1013 is configured to modulate the blue light (B) incident based on an image signal and to emit the modulated light as display light.

The display light modulated for each type of color light by the three light valves 1011, 1012, and 1013 are synthesized into one type of display light by the display light synthetic optical system 1004. As the display light synthetic optical system 1004, a cross dichroic prism is used, for example.

The display light synthesized by the display light synthetic optical system 1004 is enlarged by the projection optical system 1005 such as a projection lens, and an object to be projected is irradiated with the display light. Note that the projection optical system 1005 includes a focal length adjustment unit configured to adjust a focal length of display light and an aperture capable of adjusting the irradiation range of the display light.

The temperature sensor 1017 is an element configured to detect temperatures of the light valves 1011, 1012, and 1013 varying under the color of incident light, and for example, a thermistor, a thermocouple, an IC temperature sensor, or the like can be used as the temperature sensor 1017. The temperature sensor 1017 is preferably provided for each of the light valves 1011, 1012, and 1013 and may be provided, for example, to the light valve 1012 on which the green light (G) is incident and which affects brightness most, compared to other light valves.

The cooling unit 1006 is, for example, an electric fan (FAN) and is configured to cool each of the light source 1001 and the three light valves 1011, 1012, and 1013 by suctioning outside air and delivering the outside air through a flow path.

The control unit 1015 is electrically connected to the light source 1001, the cooling unit 1006, and the operating unit 1007 as well as electrically connected to the image signal processing unit 1016 or the temperature sensor 1017 in the electro-optical device 1003. In this case, the operating unit 1007 is not provided in the housing of the projector 1000 but serves as a remote controller (remote control) using communication such as infrared rays. Hereinafter, the operating unit 1007 is referred to as a remote control 1007. An instruction is sent to the control unit 1015 by using the remote control 1007, and thus operations such as various kinds of settings, as well as an ON/OFF operation of a power source of the projector 1000, can be performed.

The control unit 1015 can perform adjustments such as an ON/OFF operation of the light source 1001 or raising and lowering of the amount of light by the instruction with the remote control 1007 and also by a built-in operation program. In addition, the control unit 1015 can perform adjustments such as an ON/OFF operation of the cooling unit 1006 or raising and lowering of the cooling capacity.

The projector 1000 of an illumination type is not limited to the configuration described above. For example, the light source 1001 may include a plurality of light sources configured to emit color light corresponding to the three light valves 1011, 1012, and 1013. In addition, the number of the light valves is not limited to three, and a color image may be displayed by one light valve. In this case, the display light synthetic optical system 1004 becomes unnecessary.

Display Panel

Figure 3:
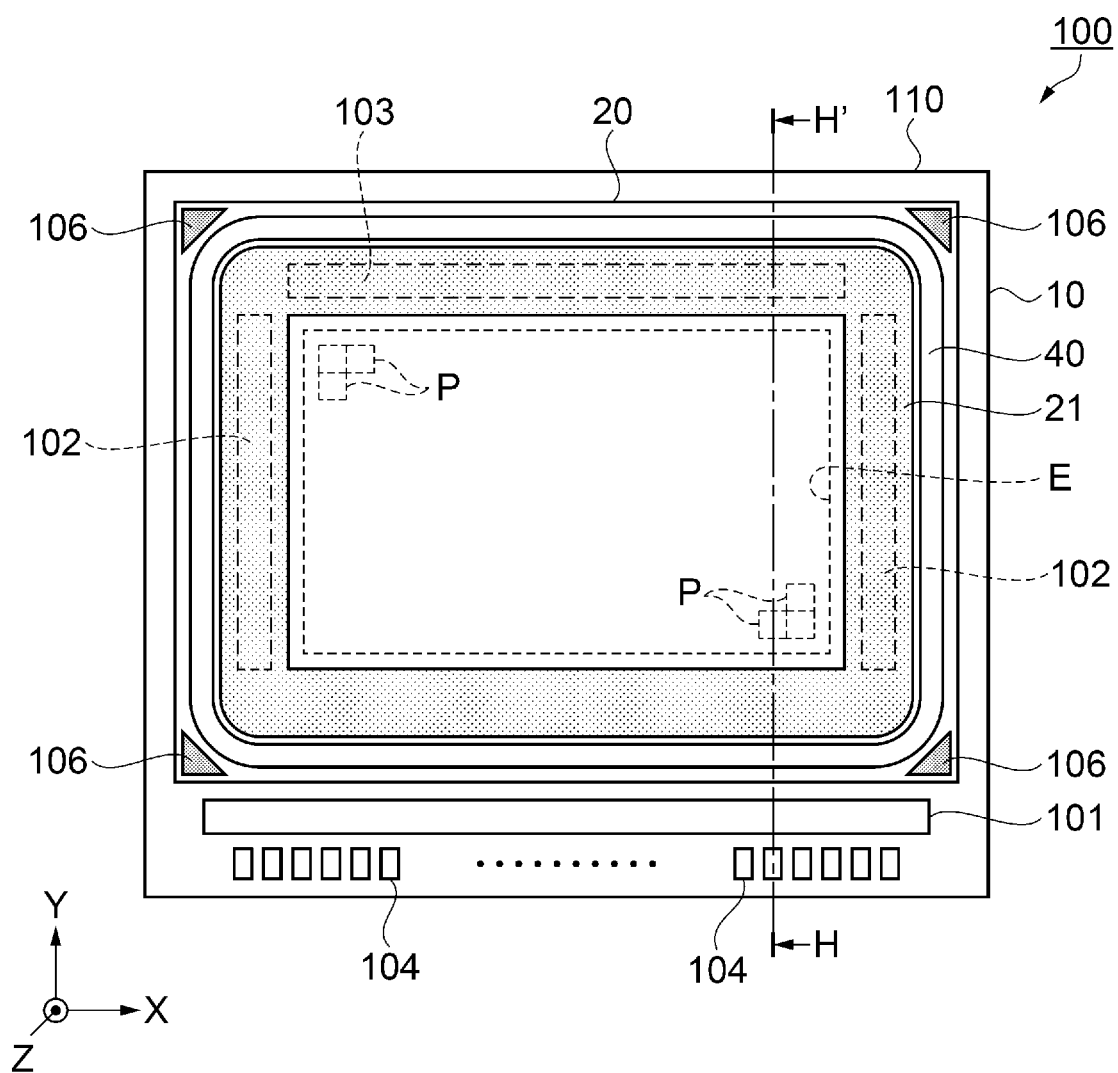
FIG. 3 is a schematic plan view illustrating a configuration of a liquid crystal device serving as a display panel.

As the light valves 1011, 1012, and 1013 being an example of the display panel of the disclosure, a liquid crystal device is used. Hereinafter, the liquid crystal device will be described with reference to FIGS. 3 to 5. FIG. 3 is a schematic plan view illustrating a configuration of the liquid crystal device serving as a display panel, FIG. 4 is a schematic cross-sectional view illustrating a structure of the liquid crystal device taken along the line H-H' in FIG. 3, and FIG. 5 is an equivalent circuit diagram illustrating an electrical configuration of the liquid crystal device.

Figure 4:
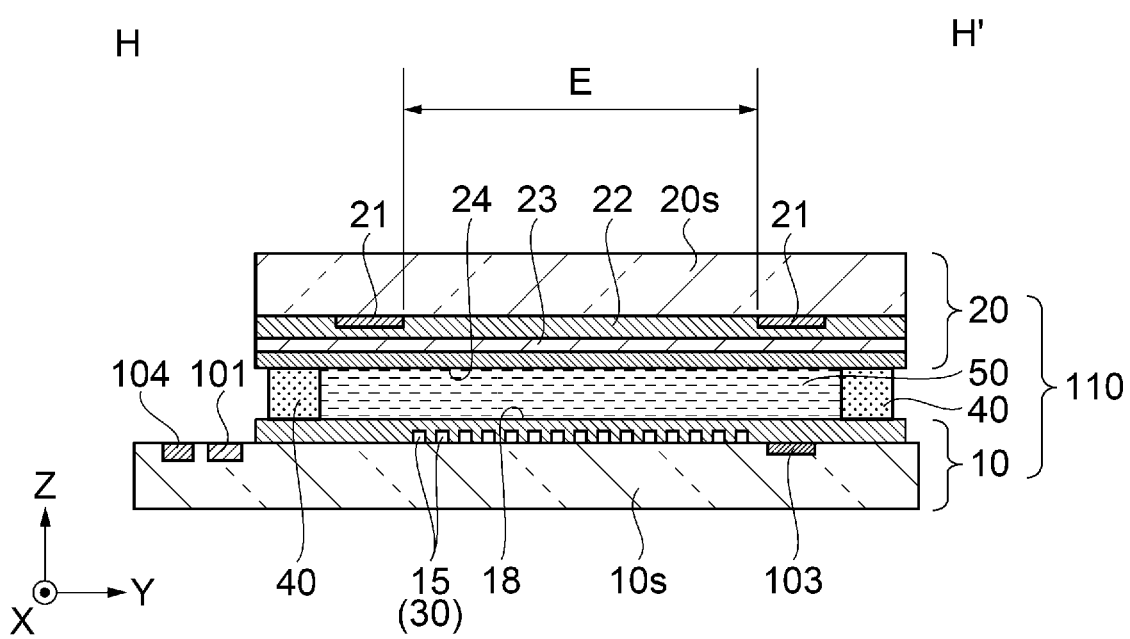
FIG. 4 is a schematic cross-sectional view of a structure of the liquid crystal device taken along line H-H' in FIG. 3.
Figure 5:
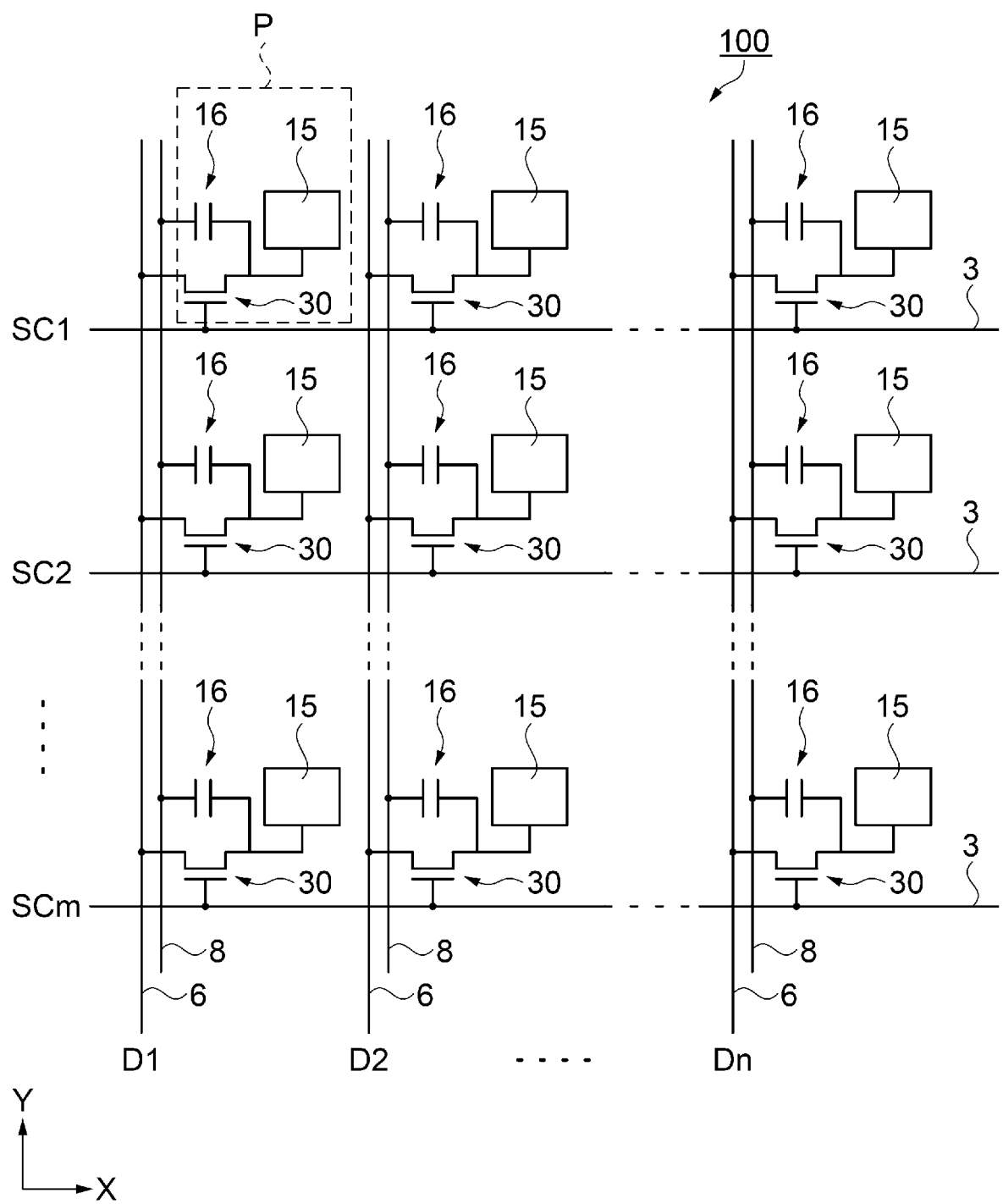
FIG. 5 is an equivalent circuit diagram illustrating an electrical configuration of the liquid crystal device.

As illustrated in FIG. 3 and FIG. 4, a liquid crystal device 100 serving as a display panel includes a liquid crystal panel 110 including an element substrate 10 and a counter substrate 20 disposed to face each other; and a liquid crystal layer 50 interposed between a pair of these substrates. For example, a quartz substrate or a glass substrate being transparent is used for each of a base material 10s of the element substrate 10 and a base material 20s of the counter substrate 20.

The element substrate 10 is larger in size than the counter substrate 20, and both the substrates are affixed to each other and are spaced apart from each other at an interval via a seal portion 40 disposed along an outer edge of the counter substrate 20. A liquid crystal is injected into an inner side of the seal portion 40 disposed in a frame shape to constitute the liquid crystal layer 50. Note that an example of a method for injecting the liquid crystal into the interval includes a One Drop Fill (ODF) method in which a liquid crystal is dropped into the inner side of the seal portion 40 disposed in a frame shape, and the element substrate 10 and the counter substrate 20 are affixed to each other under a reduced pressure.

In the seal portion 40, for example, an adhesive such as a thermosetting or ultraviolet-curable epoxy resin can be used. In the exemplary embodiment, an ultraviolet-curable epoxy resin is employed. In the seal portion 40, a spacer (not illustrated) is mixed, the spacer being configured to keep the interval between the pair of substrates to be constant.

A display region E in which a plurality of pixels P are arrayed in a matrix pattern is provided on the inner side of the seal portion 40. In addition, a partition portion 21 having a light shielding property is provided between the seal portion 40 and the display region E to surround the display region E. The partition portion 21 includes, for example, a metal or a metal compound having a light shielding property. Note that the display region E may include, in addition to an effective pixel P contributing to display, a plurality of dummy pixels surrounding the effective pixel P.

The element substrate 10 is provided with a terminal portion in which a plurality of external connection terminals 104 are arrayed. A data line drive circuit 101 is provided between a first side portion along the terminal portion and the seal portion 40. In addition, an inspection circuit 103 is provided between the seal portion 40 and the display region E, along a second side portion facing the first side portion. Further, scanning line drive circuits 102 are provided between the seal portion 40 and the display region E, along a third side portion and a fourth side portion orthogonal to the first side portion and facing each other. Between the seal portion 40 of the second side portion and the inspection circuit 103, a plurality of lines of wiring (not illustrated) connecting the two scanning line drive circuits 102 are provided.

Wiring (not illustrated) connected to the data line drive circuit 101 and the scanning line drive circuits 102 is connected to the plurality of external connection terminals 104 arrayed along the first side portion. Note that the arrangement of the inspection circuit 103 is not limited to the arrangement described above, and the inspection circuit 103 may be provided at a position along the inner side of the seal portion 40 between the data line drive circuit 101 and the display region E.

Hereinafter, descriptions will be given assuming that a direction along the first side portion is defined as an X direction; a direction along the third side portion is defined as a Y direction; and a direction orthogonal to the X direction and the Y direction and directed from the element substrate 10 to the counter substrate 20 is defined as a Z direction. In addition, viewing from the counter substrate 20 side along the Z direction is referred to as "in a plan view" or "planarly."

As illustrated in FIG. 4, on the liquid crystal layer 50 side of the element substrate 10, a pixel electrode 15 being transmissive and provided for each pixel P, a thin film transistor (hereinafter referred to as a TFT) 30 serving as a switching element of the pixel electrode 15, signal wiring, and an alignment film 18 covering these components are formed. The element substrate 10 includes a base material 10s, the pixel electrode 15 formed on the base material 10s, the TFT 30 serving as a transistor, the signal wiring, and the alignment film 18.

The counter substrate 20 disposed facing the element substrate 10 includes a base material 20s; the partition portion 21 formed on the base material 20s; a planarization layer 22 formed to cover the partition portion 21; a counter electrode 23 covering the planarization layer 22, provided at least in the display region E in the base material 20s and functioning as a common electrode; and an alignment film 24 covering the counter electrode 23.

As illustrated in FIG. 3, the partition portion 21 surrounds the display region E and is provided at a position where the partition portion 21 planarly overlaps with the scanning line drive circuit 102 and the inspection circuit 103. Thus, the partition portion 21 serves to block light incident on these circuits from the counter substrate 20 side to prevent malfunction of these circuits due to the light. In addition, the partition portion 21 blocks light to prevent an unnecessary stray light from being incident on the display region E and ensures a high contrast in display by the display region E. Note that, in the exemplary embodiment, since the seal portion 40 is formed by using an ultraviolet-curable epoxy resin, the partition portion 21 is disposed not to overlap with the seal portion 40 in a plan view. Accordingly, in consideration of positional accuracy in affixing the element substrate 10 and the counter substrate 20 to each other and of an ultraviolet curing property of the seal portion 40, there is a slight gap (see FIG. 3).

The planarization layer 22 includes, for example, an inorganic material such as a silicon oxide, has light-translucency, and is provided to cover the partition portion 21. An example of a method for forming such a planarization layer 22 includes a method for forming a film by using plasma CVD or the like.

The counter electrode 23 includes a transparent conductive film such as an Indium Tin Oxide (ITO) film, covers the planarization layer 22, and is also electrically connected to vertical conducting portions 106 provided at four corners of the counter substrate 20 as illustrated in FIG. 3. The vertical conducting portions 106 are electrically connected to wiring on the element substrate 10 side.

The alignment film 18 covering the pixel electrode 15 and the alignment film 24 covering the counter electrode 23 are selected based on an optical design of the liquid crystal device 100. Examples of the alignment films 18 and 24 include an organic alignment film formed by forming a film of an organic material such as polyimide to rub a surface of the film, thus performing substantially horizontal alignment treatment with respect to liquid crystal molecules having positive dielectric anisotropy; and an inorganic alignment film formed by using a vapor phase growth method to form a film of an inorganic material such as SiOx (silicon oxide), thus performing substantially vertical alignment with respect to liquid crystal molecules having negative dielectric anisotropy.

Such a liquid crystal device 100 is of transmissive type and employs an optical design of normally white in which transmittance of the pixel P becomes a maximum in a state to which no voltage is applied; or an optical design of normally black in which transmittance of the pixel P becomes a minimum in a state to which no voltage is applied. A polarizing element is disposed and used, in accordance with the optical design, on each of an incidence side and an emission side of light of the liquid crystal panel 110 including the element substrate 10 and the counter substrate 20.

Hereinafter in the exemplary embodiment, descriptions will be made on an example in which the inorganic alignment film described above and a nematic-type liquid crystal having negative dielectric anisotropy are used as the alignment films 18 and 24, and in which the optical design of normally black is applied.

Next, an electrical configuration of the liquid crystal device 100 will be described with reference to FIG. 5. The liquid crystal device 100 includes a plurality of scanning lines 3 and a plurality of data lines 6 as signal lines insulated from one another and orthogonal to one another at least in the display region E; and common potential lines 8 disposed in parallel with one another along the data lines 6. A direction in which the scanning lines 3 extend is the X direction, and a direction in which the data lines 6 extend is the Y direction.

The scanning lines 3, the data lines 6, and the common potential lines 8 are provided, and in each of regions partitioned by these signal lines and the like, a pixel electrode 15, a TFT 30, and a capacitor element 16 are provided to constitute a pixel circuit of the pixel P.

Each scanning line 3 is electrically connected to a gate of the TFT 30, and each data line 6 is electrically connected to a source of the TFT 30. The pixel electrode 15 is electrically connected to a drain of the TFT 30.

The data line 6 is connected to the data line drive circuit 101 (see FIG. 3) and supplies, to the pixel P, image signals D1, D2, . . . , Dn supplied from the data line drive circuit 101. The scanning line 3 is connected to the scanning line drive circuit 102 (see FIG. 3), and supplies, to the pixel P, scan signals SC1, SC2, . . . , SCm supplied from the scanning line drive circuit 102.

The image signals D1 to Dn supplied from the data line drive circuit 101 to the data line 6 may be line-sequentially supplied in this order or may be supplied to the plurality of data lines 6 adjacent to one another for each group. The scanning line drive circuit 102 line-sequentially supplies, to the scanning line 3, the scan signals SC1 to SCm in a pulsed manner at a predefined timing.

The liquid crystal device 100 has a configuration in which the TFT 30 serving as a switching element is turned on for only a certain period by an input of the scan signals SC1 to SCm, and thus the image signals D1 to Dn supplied from the data line 6 are written in the pixel electrode 15 at a predefined timing. Then, the image signals D1 to Dn of a predefined level written in the liquid crystal layer 50 via the pixel electrode 15 are each held for a certain period between the pixel electrode 15 and the counter electrode 23 disposed to face each other via the liquid crystal layer 50. A frequency of each of the image signals D1 to Dn is, for example, 60 Hz.

To prevent the image signals D1 to Dn that are held from leaking, the capacitor element 16 is connected in parallel with liquid crystal capacitance formed between the pixel electrode 15 and the counter electrode 23. The capacitor element 16 is provided between the drain of the TFT 30 and the common potential line 8. The common potential line 8 is given the same potential as a common potential (LCCOM) applied to the counter electrode 23 of the counter substrate 20.

Note that the inspection circuit 103 illustrated in FIG. 3 is connected to the data lines 6 and is configured to be capable of detecting the image signals described above to check an operational defect and the like of the liquid crystal device 100 in a manufacturing process of the liquid crystal device 100, but illustration of the configuration is omitted in the equivalent circuit in FIG. 5.

The data line drive circuit 101, the scanning line drive circuit 102, and the inspection circuit 103 are peripheral circuits related to driving of the pixel circuit. In addition, the peripheral circuits may include a sampling circuit configured to sample the image signals described above and to supply the image signals to the data line 6; and a precharge circuit configured to supply a precharge signal of a predefined voltage level to the data line 6 prior to the supply of the image signals.

Such a liquid crystal device 100 is alternating current-driven to prevent the occurrence of a failure such as deterioration of a liquid crystal material caused by application of a direct current voltage of homopolarity to the liquid crystal layer 50. Specifically, an alternating-current signal having a positive polarity potential and a negative polarity potential being polarity reversed at a cycle of, for example, one horizontal period or one field period with the common potential (LCCOM) applied to the counter electrode 23 as a reference is applied to the pixel electrode 15. Even when the alternating current-drive is performed, a difference may occur between a positive voltage effective value and a negative voltage effective value in the alternating current-drive, when affected by, for example, a switching characteristic (off-leak) of the TFT 30 related to switching control of the pixel electrode 15; a difference in a work function related to the pixel electrode 15 to which a potential is given and related to the counter electrode 23; electrical properties of the alignment films 18 and 24; or the like.

When the alternating current-drive is performed in a state where the difference occurs between the positive voltage effective value and the negative voltage effective value, a bias is generated in the polarity of a potential on the pixel electrode 15 side, and thus a flicker, image retention, or the like becomes recognized over time. In particular, in the projector 1000 of an illumination type that may display a still image for a long time, image retention is likely to occur. Then, although there is a method for adjusting potential setting of the common potential (LCCOM) to eliminate or reduce such a display failure, it is substantially difficult to sequentially observe a display state to adjust the display state. For this reason, the inventors have developed a method enabling the elimination or reduction of image retention that has occurred, and the inventors have incorporated the method into the electro-optical device 1003 of the projector 1000. Hereinafter, a method for mitigating image retention in the projector 1000 of an illumination type of the exemplary embodiment will be described.

Method for Mitigating Image Retention

In the electro-optical device 1003 of the projector 1000, a normal display mode, and a specific display mode in which the light valves 1011, 1012, and 1013 are each set to have a predefined temperature higher than ordinary temperature and lower than the Ni point of the liquid crystal layer 50 of nematic and are energized in display (solid display) where brightness becomes homogeneous in a screen are selectable. In the exemplary embodiment, the specific display mode enabling elimination or reduction of image retention will be referred to as a refresh mode. Hereinafter, the refresh mode will be described with reference to a specific example.

Figure 6:
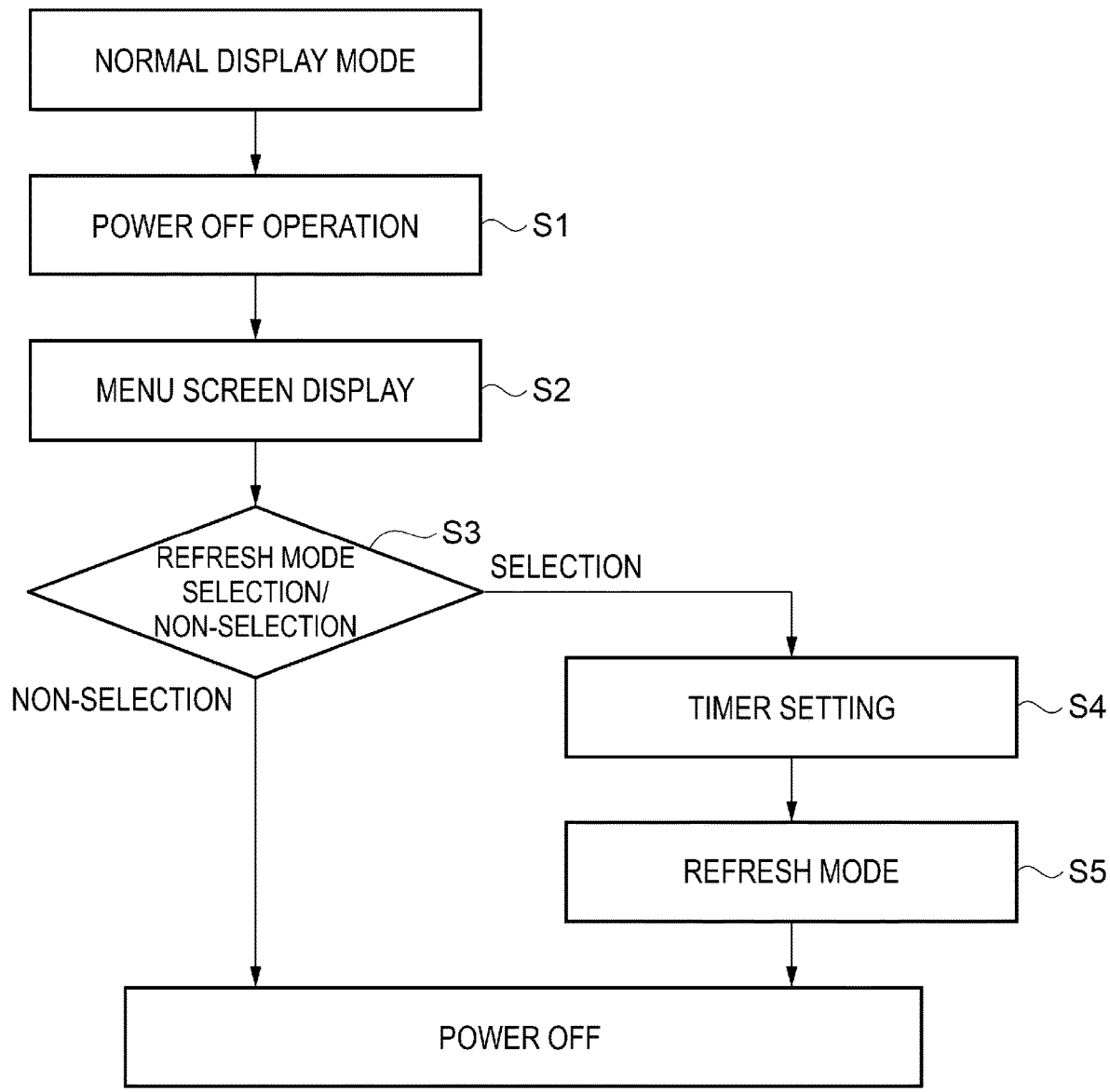
FIG. 6 is a flowchart illustrating steps related to execution of a refresh mode.

FIG. 6 is a flowchart illustrating steps related to execution of the refresh mode.

FIG. 6 illustrates an example in which selection/non-selection of the refresh mode is performed during an off sequence for turning off the power source of the projector 1000. The normal display mode as herein referred to includes, in addition to the state where a still image or a moving image is displayed as described above, a state where a display functions as an illumination while the display is performed.

As illustrated in FIG. 6, during the off sequence, an operation of turning off the power source is performed from a state where the display is performed in the normal display mode (step S1). The operation of turning off the power source at step S1 in the exemplary embodiment refers to an operation of pressing a power button of the remote control 1007 in a state where the remote control 1007 (see FIG. 2) is directed to the projector 1000. When the operation of turning off the power source, a menu screen is displayed on a projected screen (step S2). In this state, since the power source has not been turned off yet, color light is incident on the light valves 1011, 1012, and 1013 from the light source 1001 via the color light separating optical system 1002, and the cooling unit 1006 also operates to continue cooling.

When the power source is turned on to turn on the projector 1000, the light source 1001 starts lighting, and concurrently, the cooling unit 1006 also operates. The color light is incident, and thus temperatures of the light valves 1011, 1012, and 1013 increase. However, since the light valves 1011, 1012, and 1013 are concurrently cooled by the cooling unit 1006, the temperatures of the light valves 1011, 1012, and 1013 become stable after a predefined time passes. The temperatures of the light valves 1011, 1012, and 1013 at this time are detected by the temperature sensor 1017. The temperature during the stable period of the light valves 1011, 1012, and 1013 can be defined by the amount of light from the light source 1001 and the cooling capacity of the cooling unit 1006. Although a temperature during the stable period is higher than ordinary temperature and lower than the Ni point of the liquid crystal layer 50, the cooling capacity of the cooling unit 1006 is adjusted in accordance with the amount of light from the light source 1001 to reduce the temperature as low as possible within the range where the display characteristics in the light valves 1011, 1012, and 1013 can be ensured. When the cooling unit 1006 is an electric fan, an air flow rate is electrically adjusted. Typically, the Ni point of the liquid crystal layer 50 of the liquid crystal device 100 used as the light valves 1011, 1012, and 1013 is, for example, approximately 100° C., and the temperature during the stable period is within the range of approximately from 40° C. or more to 60° C. or less. That is, temperatures of the light valves 1011, 1012, and 1013 before a start of the off sequence are approximately within the range of from 40° C. to 60° C. that are temperatures higher than ordinary temperature (25° C.).

Figure 7:
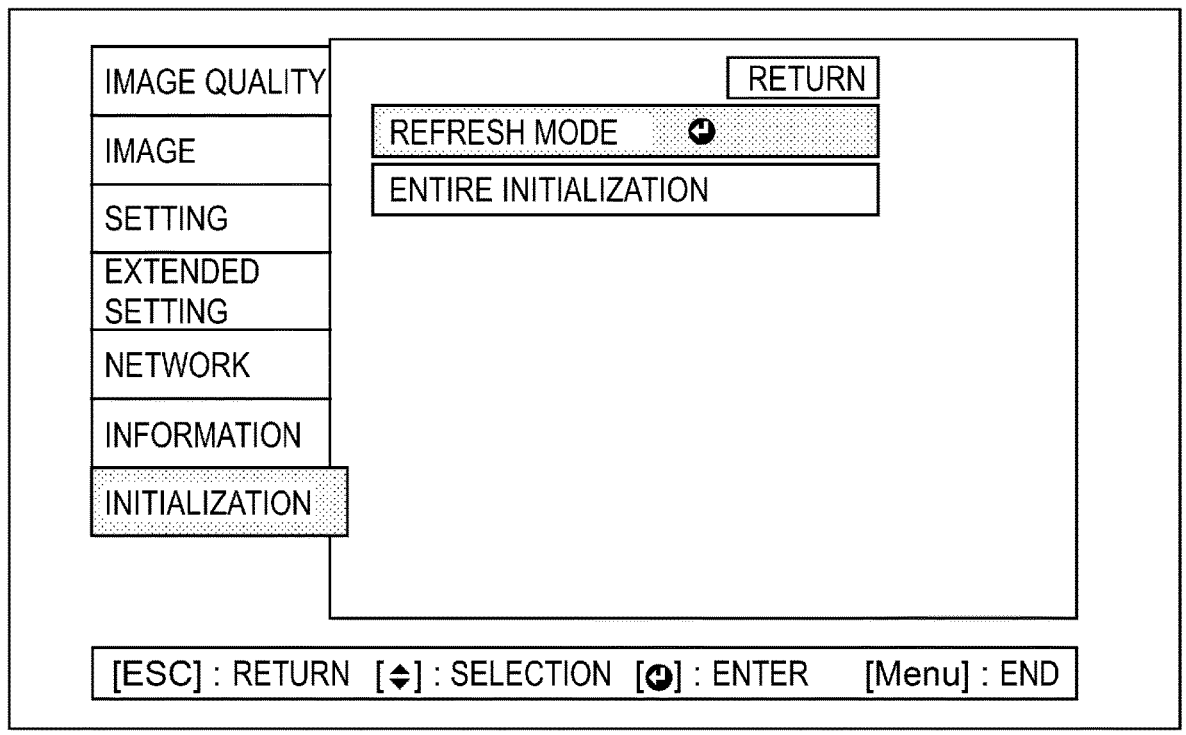
FIG. 7 is a view illustrating an example of a menu screen related to the refresh mode.

FIG. 7 is a view illustrating an example of a menu screen related to the refresh mode.

As illustrated in FIG. 7, the menu (Menu) screen is displayed to make adjustable items or operable items such as image quality, image, setting, extended setting, network, information, and initialization selectable. When the operation of turning off the power source during the off sequence, an operation screen for initialization in the menu screen illustrated in FIG. 7 is displayed. In the operation screen for initialization, options indicating "REFRESH MODE" and "ENTIRE INITIALIZATION" are displayed. Next, at step S3 of selection/non-selection of the refresh mode illustrated in FIG. 6, when a user uses the remote control 1007 to select non-selection for the refresh mode and to select [Menu]: END, the power source of the projector 1000 is automatically turned off by the control unit 1015. As illustrated in FIG. 7, when the user uses the remote control 1007 to select the "REFRESH MODE," the process proceeds to the timer setting (step S4) as illustrated in FIG. 6 by the built-in operation program in the control unit 1015.

Figure 8:
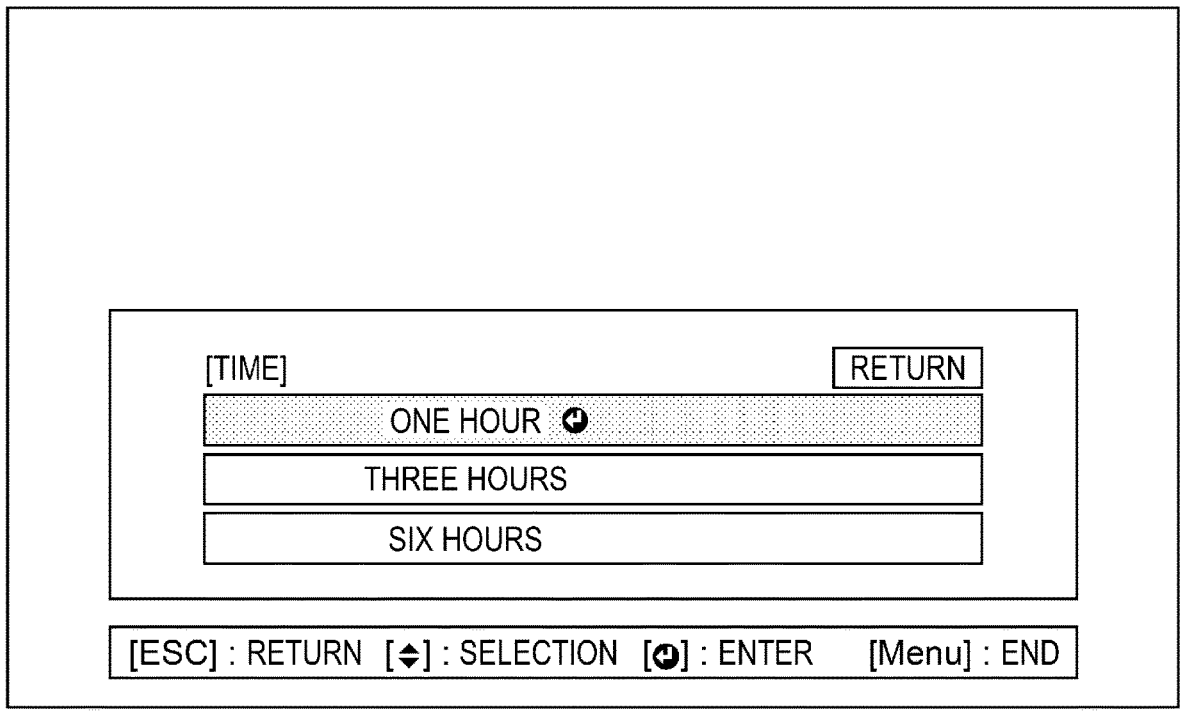
FIG. 8 is a view illustrating an example of a menu screen for a timer setting.

FIG. 8 is a view illustrating an example of a menu screen for the timer setting. Note that, although a timer is not illustrated in the block diagram of FIG. 2, in the exemplary embodiment, the timer is defined based on an electric signal of a constant cycle transmitted from an oscillator built in the control unit 1015.

At step S4 of FIG. 6, time for executing the refresh mode is set. As illustrated in FIG. 8, in the menu screen indicating the timer setting, three options of "ONE HOUR," "THREE HOURS," and "SIX HOURS" are indicated as the time for executing the refresh mode. When the user uses the remote control 1007 to select, for example, "ONE HOUR," the timer setting ends, and the process proceeds to the refresh mode (step S5) illustrated in FIG. 6.

Figure 9:
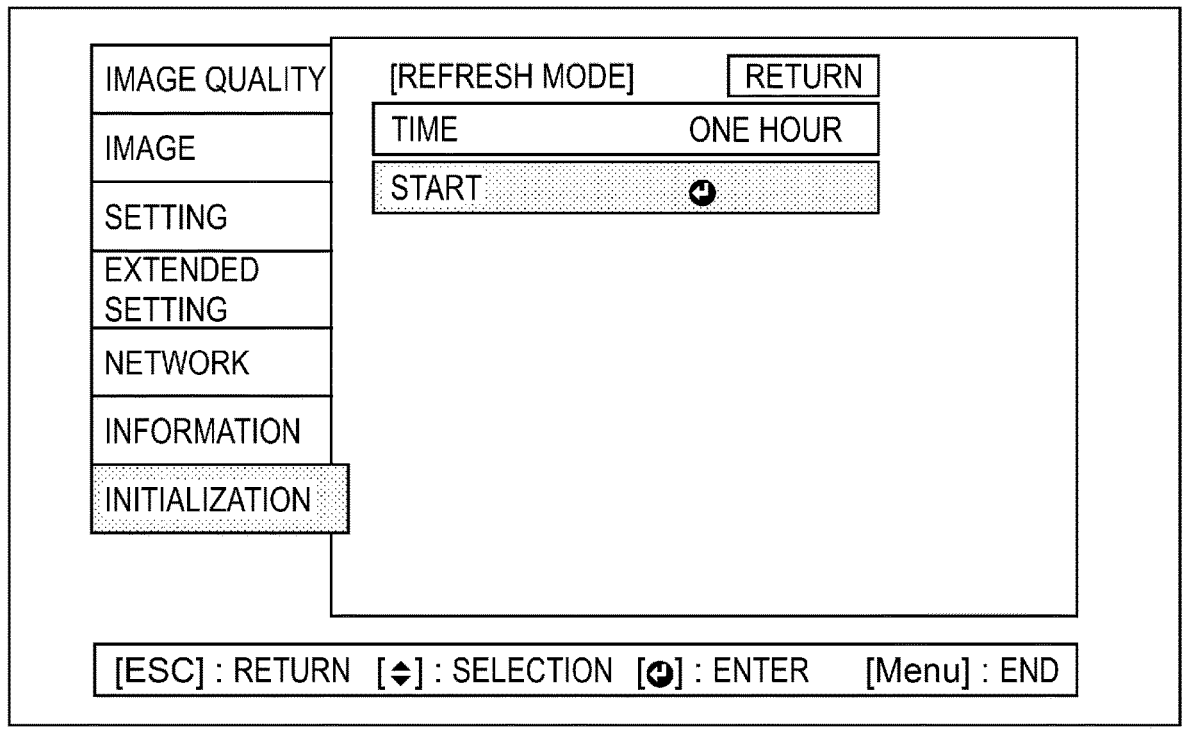
FIG. 9 is a view illustrating an example of a menu screen related to a start of the refresh mode.

FIG. 9 is a view illustrating an example of a menu screen related to a start of the refresh mode. When the process proceeds to step S5, as illustrated in FIG. 9, a menu screen related to the start of the refresh mode is displayed, and the time set at the previous step, step S4, is displayed. When the user uses the remote control 1007 to select and execute "START", the control unit 1015 starts the refresh mode based on the operation program and executes the refresh mode for the time set in advance (one hour here). The refresh mode is executed, as described above, in a state where color light from the light source 1001 is caused to be incident on the light valve (liquid crystal device 100) and the light valve (liquid crystal device 100) is warmed to a predefined temperature. When the execution of the refresh mode ends, the power source of the projector 1000 is automatically turned off.

As described above, the refresh mode is the specific display mode in which energization is performed in solid display where brightness becomes homogeneous in a screen. In such solid display, a drive voltage is set to cause a variation in a light transmittance of the pixel P in the liquid crystal device 100 relative to the transmittance in the liquid crystal device 100 when not energized to be 0.1% or less. The drive voltage set in the refresh mode is applied to each of the pixels P located in a screen contributing to display in the liquid crystal device 100.

The liquid crystal device 100 of the exemplary embodiment is of normally black in which the liquid crystal device 100 has black display when the liquid crystal device 100 is not energized, and thus in the solid display, a drive voltage is set to cause an increase in a light transmittance of the pixel P in the liquid crystal device 100 relative to the transmittance in the liquid crystal device 100 when not energized to be 0.1% or less.

Figure 10:
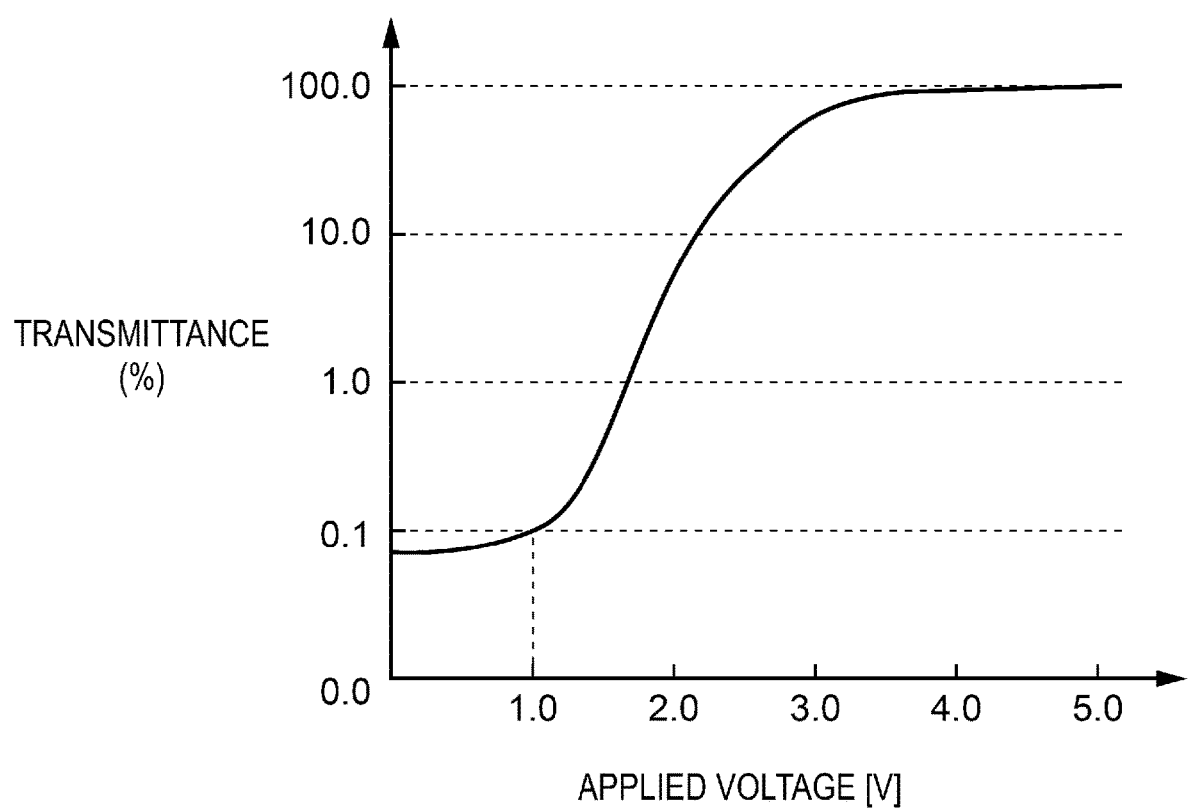
FIG. 10 is a graph of VT characteristics representing a relationship between an applied voltage and a transmittance of the liquid crystal device.

FIG. 10 is a graph of a VT characteristic representing a relationship between an applied voltage and a transmittance of the liquid crystal device. Note that the transmittance on a vertical axis in the graph of FIG. 10 is provided in a logarithmic expression. As illustrated in FIG. 10, in the liquid crystal device 100 of the exemplary embodiment, when an applied voltage is approximately 1.0 V, an increase in a transmittance becomes 0.1%. That is, when the applied voltage is approximately 1.0 V, the transmittance scarcely varies, and the black display is maintained. The applied voltage in the graph of the VT characteristic indicates an effective voltage applied to the liquid crystal layer 50. In other words, in the refresh mode, the liquid crystal device 100 is alternating current-driven to cause the voltage effective value to be 1.0 V or less.

In the alternating current-drive in which the voltage effective value is 1.0 V or less, the positive voltage effective value and the negative voltage effective value with the common potential (LCCOM) as a reference are small values as compared to in the normal display mode, and thus a difference between the positive voltage effective value and the negative voltage effective value becomes significantly small. Accordingly, in the normal display mode, a bias in the polarity of a potential generated on the pixel electrode 15 side from the difference between the positive voltage effective value and the negative polarity voltage effective value is mitigated by executing the refresh mode. In particular, when the liquid crystal layer 50 contains an ionic substance, a bias in the polarity of a potential is generated on the pixel electrode 15 side in the normal display mode, and the ionic substance is attracted and adsorbed. Such adsorption of the ionic substance becomes a factor of image retention. Then, since an adsorption state of the ionic substance at a liquid crystal interface differs between a bright display portion and a dark display portion in a screen, such an image retention phenomenon is visually recognized, but the adsorption state of the ionic substance can be made uniform in the screen by the solid display in the refresh mode. In addition, to mitigate the adsorption of the ionic substance, it is effective to increase mobility of the ionic substance by warming, and the refresh mode is preferably executed at a predefined temperature higher than ordinary temperature (25° C.) and lower than the Ni point of the liquid crystal layer 50.

In a case where the refresh mode is executed during the off sequence, the temperatures of the light valves 1011, 1012, and 1013 are from 40° C. to 60° C. as described above before the power source is turned off, and thus the refresh mode is executed in a state where the light valves 1011, 1012, and 1013 are warmed to a predefined temperature. The predefined temperature in the refresh mode is preferably from 40° C. to 90° C., and more preferably from 60° C. to 80° C.

To set the predefined temperature to be from 60° C. to 80° C., the cooling unit 1006 is stopped or the cooling capacity is reduced by the control unit 1015 in a state where the light source 1001 is turned on. Then, the temperatures of the light valves 1011, 1012, and 1013 can be increased promptly to be from 60° C. to 80° C.

Thus, during the off sequence, the refresh mode is selected and executed, and thus image retention that has occurred so far in the normal display mode is eliminated or reduced. Accordingly, when the power source is subsequently turned on and the projector 1000 is brought into a display state, a display state or an illumination state is realized where image retention is eliminated or reduced, and in addition, where a flicker or the like is made not conspicuous, and good appearance is achieved. Since the refresh mode is applied during the off sequence depending on the state of the image retention in the normal display mode, whether the menu screen is displayed may be scheduled in advance. For example, when the display is continually performed for predefined time (for example, eight hours or more) in the normal display mode, the menu screen is automatically displayed during the off sequence, and when a display period is less than the predefined time, the process may proceed to a step of turning off the power source without displaying the menu screen. In addition, such scheduling may be determined in consideration of the total usage time of the projector 1000.

Note that the execution of the refresh mode is not limited to the execution during the off sequence. The refresh mode may be executed during an on sequence performed at the time of turning on the power source to turn on the projector 1000 or may be executed while the display or illumination is performed. In that case, when the predefined temperature in the refresh mode is set to be higher than the Ni point of the liquid crystal layer 50, an excellent effect in elimination or reduction of image retention is expected. However, it takes time from at the end of the refresh mode to cool to a temperature at which the display can be performed, and thus, in consideration of enabling immediate display after the end of the refresh mode, the predefined temperature is preferably lower than the Ni point.

In addition, a period in which the refresh mode is executed preferably has the amount of light from the light source 1001 reduced by the control unit 1015 as compared to in the normal display mode. The liquid crystal device 100 of the exemplary embodiment is of normally black, and thus when the refresh mode is executed as described above, black display is maintained. However, in a case where the projector 1000 is used as illumination, it is conceivable that even when a transmittance in the refresh mode increases by approximately 0.1%, the execution of the refresh mode is recognized by a third person seeing an object illuminated. Similarly, in a case where the liquid crystal device 100 is of normally white, a variation in the transmittance may also be recognized. That is, to make the refresh mode not to be recognized in a rendition effect in illumination, the period in which the refresh mode is executed preferably has the amount of light from the light source 1001 reduced. In addition, it is effective from the viewpoint of power saving to reduce the amount of light from the light source 1001.

As a matter of course, when the amount of light from the light source 1001 is reduced, temperatures of the light valves 1011, 1012, and 1013 reduce, and thus from the viewpoint of maintaining the predefined temperature in the refresh mode, the control unit 1015 desirably reduces the amount of light from the light source 1001 together with adjusting cooling capacity of the cooling unit 1006.

Evaluation Method for Mitigation of Image Retention

An evaluation method for mitigation of image retention in such a refresh mode will be described with reference to a specific example. As a method for causing image retention to occur in a display state, for example, display having a frame shape (window frame shape) with an inner side being white display and an outer side being black display is performed for certain time (in this case, 20 hours) to cause image retention to occur. Subsequently, the whole screen is set to be, for example, of half-tone raster display. Illuminances of the previous white display portion in the half-tone raster display and the black display portion are measured to determine an illuminance difference of the illuminances, and the illuminance difference is defined as an image retention rate. The refresh mode is executed for predefined time to examine how the image retention rate varies, and thus an effect of mitigation of image retention in the refresh mode is evaluated.

When a drive voltage of solid display where brightness becomes homogeneous in a screen at ordinary temperature (25° C.) is set at 1.0 V to perform energization, the image retention rate is mitigated by just 5% even after 12 hours of the energization time. In contrast, when a drive voltage of solid display is set at 1.0 V, a temperature of the light valve, that is, the liquid crystal device 100 is set at approximately 70° C., and the refresh mode is performed for one hour, a degree of elimination of an image retention rate reaches approximately 30%. When the refresh mode is performed for three hours, a degree of elimination of an image retention rate reaches approximately 70%, and when the refresh mode is further performed for six hours, image retention is eliminated to a level where the image retention cannot be recognized visually. That is, when the refresh mode is performed at a predefined temperature higher than ordinary temperature (25° C.) and lower than the Ni point, image retention can be mitigated. In addition, a flicker is also reduced.

According to the projector 1000 of an illumination type (electro-optical device 1003) of the exemplary embodiment, the following effects can be provided.

(1) In the electro-optical device 1003 serving as a light modulating unit, the normal display mode and the refresh mode serving as the specific display mode in which the light valve (liquid crystal device 100) is set to have a predefined temperature higher than ordinary temperature (25° C.) and lower than the Ni point of the liquid crystal layer 50 and is energized in display (solid display) where brightness becomes homogeneous in a screen are selectable, and even when image retention occurs in the normal display mode, the image retention can be eliminated or reduced by executing the refresh mode. That is, the projector 1000 (electro-optical device 1003) capable of mitigating image retention that has occurred in the normal display mode can be provided.

(2) Light is caused to be incident on the light valve (liquid crystal device 100) from the light source 1001 to set the light valve (liquid crystal device 100) to have a predefined temperature (from 40° C. to 90° C.), the refresh mode is performed, and thus image retention can be mitigated promptly as compared to a case where the refresh mode is executed at ordinary temperature (25° C.). In addition, light is caused to be incident from the light source 1001 to warm the light valve (liquid crystal device 100), and thus the light valve can be set to have a predefined temperature without unevenness.

(3) In the light valve (liquid crystal device 100) of normally black, a drive voltage of solid display in the refresh mode is set to cause an increase in a light transmittance of the pixel P in the liquid crystal device 100 relative to the transmittance in the liquid crystal device 100 when not energized to be 0.1% or less. Accordingly, even when the refresh mode is employed to improve image retention, black display becomes the same as black display achieved when energization is not performed, and thus light leakage occurring in the refresh mode is suppressed, and the refresh mode employed in the projector 1000 (electro-optical device 1003) is not recognized.

(4) Selection/non-selection of the refresh mode can be performed in the menu screen displayed during the off sequence in which the power source of the projector 1000 is turned off, and a time can be set by the timer based on determination depending on an image retention state and a usage situation of the projector 1000 to execute the refresh mode. When the projector 1000 is subsequently used, display or illumination can be performed in a state where image retention and also a flicker are mitigated.

Note that the disclosure is not limited to the above-described exemplary embodiment, and various modifications and improvements can be made to the above-described exemplary embodiment. Such modified examples are described below.

Modified Example 1

In the electro-optical device 1003 of the projector 1000 of the above-described exemplary embodiment, the temperature sensor 1017 may not necessarily be provided. For example, when a relationship between irradiation time of light and a temperature in the light valve (liquid crystal device 100) is determined in advance from a relationship between the amount of light incident from the light source 1001 on the light valve (liquid crystal device 100) and cooling capacity by the cooling unit 1006, the temperature of the light valve (liquid crystal device 100) can be defined with the irradiation time as a reference. That is, the refresh mode can be executed by determining, without using the temperature sensor 1017 and according to the irradiation time, whether the light valve (liquid crystal device 100) has reached the predefined temperature.

Modified Example 2

In the electro-optical device 1003 of the projector 1000 of the above-described exemplary embodiment, a heating unit (for example, a heater or the like) capable of warming the light valve (liquid crystal device 100) to a predefined temperature may be provided. Accordingly, even when an ambient temperature is significantly lower than ordinary temperature (for example, zero degrees or less), the light valve (liquid crystal device 100) can be warmed promptly, and the normal display mode can be executed). Also, the refresh mode can be carried out readily during an on sequence in which the power source is turned on.

Modified Example 3

A projection-type display apparatus to which the electro-optical device 1003 of the above-described exemplary embodiment can be applied is not limited to the projector 1000 of an illumination type. The electro-optical device 1003 may be applied to a large-sized digital signage (electronic signage) or a projector capable of projection mapping.

Contents derived from the exemplary embodiments are described below.

An electro-optical device of the present application includes a display panel including a liquid crystal layer interposed between a pair of substrates, and a normal display mode, and a specific display mode in which the display panel is set to have a predefined temperature higher than ordinary temperature and lower than an Ni point of the liquid crystal layer and is energized in display where brightness becomes homogeneous in a screen are selectable.

According to the present application, even when, for example, a still image is displayed for a long time in the normal display mode and image retention occurs, the image retention can be mitigated effectively by employing the specific display mode in which the display panel is set to have a predefined temperature higher than ordinary temperature and lower than the Ni point of the liquid crystal layer and is energized in display where brightness becomes homogeneous in a screen. In other words, the electro-optical device capable of effectively mitigating image retention that has occurred in the normal display mode can be provided.

In the electro-optical device described above, light from the light source is caused to be incident on the display panel, and the display panel is set to have a predefined temperature.

Accordingly, light from the light source is utilized to warm the display panel to a predefined temperature, and thus the display panel can be warmed without unevenness. That is, image retention can be mitigated without unevenness.

In addition, the electro-optical device described above may include a heating unit capable of warming the display panel to a predefined temperature.

Accordingly, even when an ambient temperature is lower than ordinary temperature, the display panel can be warmed promptly to the predefined temperature.

In the electro-optical device described above, the predefined temperature is within the range of from 40° C. or more to 90° C. or less. In consideration of environmental performance of the electro-optical device, the Ni point that is a phase transition temperature at which the liquid crystal layer of a nematic phase becomes an optically isotropic phase is desirably as high as possible and is set at approximately 100° C., for example.

Accordingly, when image retention is mitigated in the specific display mode at the predefined temperature being within the range of from 40° C. or more to 90° C. or less, and even when the display mode is set back to the normal display mode after the mitigation is achieved, display can be performed while display quality is ensured.

In addition, the electro-optical device described above preferably employs the specific display mode in which a drive voltage for display is set to cause a variation in a light transmittance of a pixel in the display panel relative to the transmittance in the display panel when not energized to be 0.1% or less.

Accordingly, even when the specific display mode is employed to improve image retention, a display state becomes the same as a display state achieved when energization is not performed, and thus it becomes difficult to recognize that the specific display mode is employed. That is, the specific display mode employed in the electro-optical device is not recognized.

In addition, in the electro-optical device described above, the display panel is of normally black, and the specific display mode may be employed, in which a drive voltage for display is set to cause an increase in a light transmittance of a pixel in the display panel relative to the transmittance in the display panel when not energized to be 0.1% or less may be employed.

Accordingly, even when the specific display mode is employed to improve image retention, black display becomes the same as black display achieved when energization is not performed, and thus light leakage occurring in a specific display mode is suppressed; and the specific display mode employed in the electro-optical device is not recognized.

In addition, the electro-optical device described above preferably includes a timer capable of setting energization time in the specific display mode.

Accordingly, energization time performed in the specific display mode can be controlled by using the timer. For example, the specific display mode can be carried out for the energization time enabling mitigation of image retention, and then measures such as automatically turning off the power source can be taken. That is, an ON/OFF operation of the specific display mode for mitigating image retention is performed by using the timer to enhance convenience.

A projection-type display apparatus according to the present application includes a light source, a light modulating unit configured to modulate light from the light source based on image information, and a projection optical system configured to enlarge and project display light modulated by the light modulating unit, and as the light modulating unit, the electro-optical device according to any of the above is used.

According to the present application, the projection-type display apparatus capable of mitigating image retention that has occurred in the normal display mode to maintain desired display quality can be provided.

In addition, in the projection-type display apparatus described above, a menu screen capable of selection of the specific display mode is preferably displayed.

Accordingly, since the specific display mode becomes selectable by displaying the menu screen, determination and execution of selection/non-selection of the specific display mode by a user becomes readily achieved.

In the projection-type display apparatus described above, the menu screen is preferably displayed during an off sequence in which a power source is turned off.

Accordingly, the menu screen is displayed during an off sequence to enable selection of the specific display mode, and thus image retention that has occurred in the normal display mode before the power source is turned off is mitigated; and when the power source is subsequently turned on to employ the normal display mode, a display state where the image retention is mitigated can be achieved.

According to the projection-type display apparatus described above, in the electro-optical device, a period in which the specific display mode is executed preferably has the amount of light from the light source reduced as compared to in the normal display mode.

Accordingly, execution of the specific display mode becomes difficult to recognize by a person observing a projection screen. Accordingly, for example, in a case where projecting onto an object including illumination is performed, an unnecessary illumination of the object is prevented during a period in which the specific display mode is executed. In other words, the specific display mode can be executed without being recognized by a third party.

The projection-type display apparatus described above preferably includes a cooling unit capable of cooling the display panel, and in the electro-optical device, a period in which the specific display mode is executed preferably has the cooling unit stopped or cooling capacity reduced.

Accordingly, the display panel can be set promptly by controlling the cooling unit to have the predefined temperature to execute the specific display mode.

An electro-optical device of the present application includes a display panel including a liquid crystal layer interposed between a pair of substrates, and a normal display mode and a specific display mode in which the display panel is set to have a predefined temperature higher than ordinary temperature and lower than an Ni point of the liquid crystal layer and an identical drive voltage is applied to each pixel located in a screen contributing to display by the display panel are selectable.

According to the present application, even when, for example, a still image is displayed for a long time in the normal display mode, image retention can be mitigated effectively by employing the specific display mode in which the display panel is set to have a predefined temperature higher than ordinary temperature and lower than the Ni point of the liquid crystal layer, and in which an identical drive voltage is applied to each pixel located in a screen contributing to display by the display panel. In other words, the electro-optical device capable of effectively mitigating image retention that has occurred in the normal display mode can be provided.

What is claimed is:

1. An electro-optical device comprising:
a display panel including a liquid crystal layer interposed between a pair of substrates; and
a drive unit configured to drive the display panel, wherein
the electro-optical device is configured to provide an option, when performing an operation of turning off a power source of the electro-optical device, to activate a specific display mode in which the display panel is set to have a predefined temperature higher than a predetermined temperature and lower than an Ni point of the liquid crystal layer and is energized for display where brightness is homogeneous in a screen, and
the drive unit is configured, in the specific display mode, to maintain black display of the display panel to have a variation of 0.1% or less by applying an effective voltage of 1.0 V or less.

2. The electro-optical device according to claim 1, comprising
a light source; and
a control unit configured to control a light amount of the light source, wherein
the control unit is configured, in the specific display mode, to control a light amount of light incident from the light source on the display panel, to set the display panel to have the predefined temperature.

3. The electro-optical device according to claim 1, comprising
a heater configured to warm the display panel to the predefined temperature.

4. The electro-optical device according to claim 1, wherein
the predefined temperature is within a range of from 40° C. to 90° C.

5. The electro-optical device according to claim 1, wherein
the display panel is of normally black.

6. The electro-optical device according to claim 1, comprising:
a timer configured to set energization time in the specific display mode.

7. The projection-type display apparatus according to claim 1, which employs a normal display mode, comprising:
a projection optical system configured to enlarge and project display light modulated by the display panel.

8. The projection-type display apparatus according to claim 7, wherein
a menu screen configured to enable selection of the specific display mode is displayed.

9. The projection-type display apparatus according to claim 8, wherein the menu screen is displayed during an off sequence for turning off a power source.

10. The projection-type display apparatus according to claim 7, wherein
the electro-optical device is configured to cause, during a period in which the specific display mode is being executed, a light amount of the light source to be reduced compared to the normal display mode.

11. The projection-type display apparatus according to claim 10, comprising a cooling unit configured to cool down the display panel, wherein
the electro-optical device is configured, during a period in which the specific display mode is being executed, to cause the cooling unit to cease cooling down or to lower a cooling capacity.

12. An electro-optical device comprising:
a display panel including a liquid crystal layer interposed between a pair of substrates; and
a drive unit configured to drive the display panel, wherein
the electro-optical device is configured to provide an option, when preforming an operation of turning off a power source of the electro-optical device, to activate a specific display mode in which the display panel is set to have a predefined temperature higher than a predetermined temperature and lower than an Ni point of the liquid crystal layer, and in which an identical drive voltage is applied to each pixel located in a screen contributing to display by the display panel, and
the drive unit is configured, in the specific display mode, to maintain black display of the display panel to have a variation of 0.1% or less by applying an effective voltage of 1.0 V or less.

13. A method of driving an electro-optical device that comprises a display panel including a liquid crystal layer interposed between a pair of substrates; and a drive unit configured to drive the display panel, the method comprising:
reducing image retention by employing a specific display mode in which the display panel is set to have a predefined temperature higher than ordinary temperature and lower than an Ni point of the liquid crystal layer and is energized for display where brightness is homogeneous in a screen, and
maintaining, in the specific display mode, black display of the display panel to have a variation of 0.1% or less by applying an effective voltage of 1.0 V or less.

* * * * *